(12) United States Patent
Yamashita et al.

(10) Patent No.: US 6,292,295 B1
(45) Date of Patent: *Sep. 18, 2001

(54) REAR PROJECTION SCREEN INCORPORATING A PRISM

(75) Inventors: Hajime Yamashita; Kiyoshi Morimoto; Yoshihiro Kumagai; Hideki Kobayashi, all of Niigata (JP)

(73) Assignee: Kuraray Co., Ltd., Kurashiki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/210,796

(22) Filed: Dec. 15, 1998

(30) Foreign Application Priority Data

Dec. 16, 1997 (JP) .................................................... 9-346007

(51) Int. Cl.⁷ .............................. G03B 21/56; G02B 3/08
(52) U.S. Cl. ............................................. 359/460; 359/742
(58) Field of Search ............................... 359/443, 454, 359/455, 456, 457, 460, 742, 743

(56) References Cited

U.S. PATENT DOCUMENTS

| | | | |
|---|---|---|---|
| 3,972,596 | 8/1976 | Baumgardner et al. | 350/286 |
| 4,512,631 * | 4/1985 | Van Breeman | 350/128 |
| 4,531,812 * | 7/1985 | Oguino | 350/128 |
| 4,688,905 * | 8/1987 | Okamura | 350/452 |
| 4,871,233 * | 10/1989 | Sheiman | 350/286 |
| 4,919,518 | 4/1990 | Ogino et al. | 350/128 |
| 4,936,657 * | 6/1990 | Tejima et al. | 350/331 R |
| 5,066,099 | 11/1991 | Yoshida et al. | 359/457 |
| 5,206,761 * | 4/1993 | Ogino | 359/457 |
| 5,453,880 * | 9/1995 | Vanderwerf | 359/742 |
| 5,513,036 * | 4/1996 | Watanabe et al. | 359/457 |
| 5,582,473 * | 12/1996 | Toide et al. | 353/74 |

FOREIGN PATENT DOCUMENTS 0 447 600   9/1991   (EP) .

* cited by examiner

Primary Examiner—Christopher E. Mahoney
(74) Attorney, Agent, or Firm—Oblon, Spivak, McClelland, Maier & Neustadt, P.C.

(57) ABSTRACT

A rear projection screen is used for a projection optical system where projected lights perpendicularly enter the screen from the rear face of the screen includes a Fresnel lens sheet incorporating a prism and a lenticular lens sheet that horizontally disperses lights emitted from the Fresnel lens sheet incorporating a prism. The Fresnel lens sheet incorporating a prism has a linear prism, which acts as a linear Fresnel lens for converging image lights in the screen height direction, at the projection light source side, and has a circular Fresnel lens, which acts to converge image lights in the direction of the screen center, at the observer side. According to the rear projection screen, the peak screen gain is increased and the peripheral luminance ratio is improved without degrading light utilization efficiency.

12 Claims, 10 Drawing Sheets

Fig. 5A  Fig. 5B  Fig. 5C  Fig. 5D
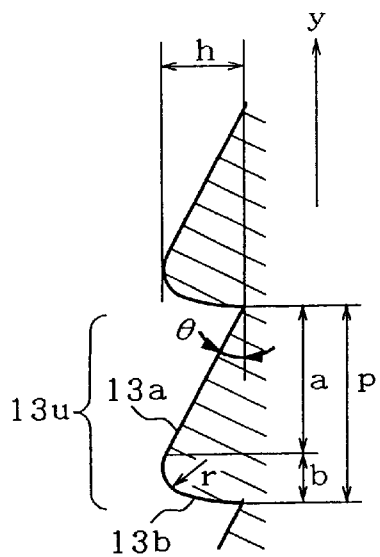 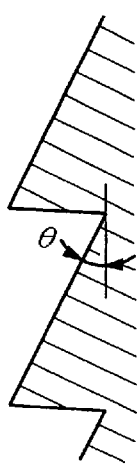 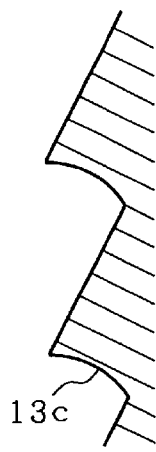 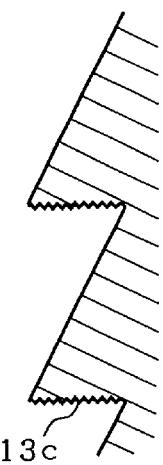
Fig. 6
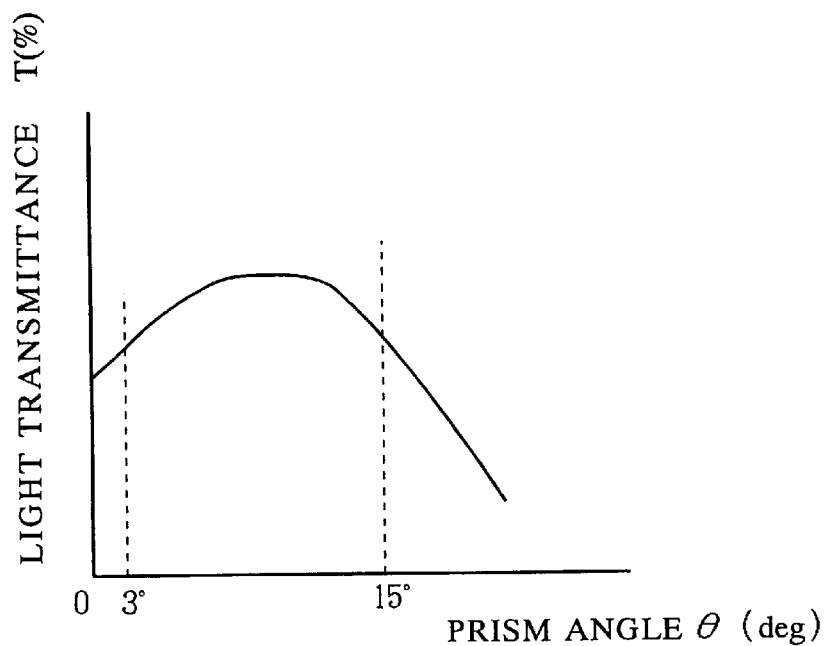

Fig. 15
RELATED ART
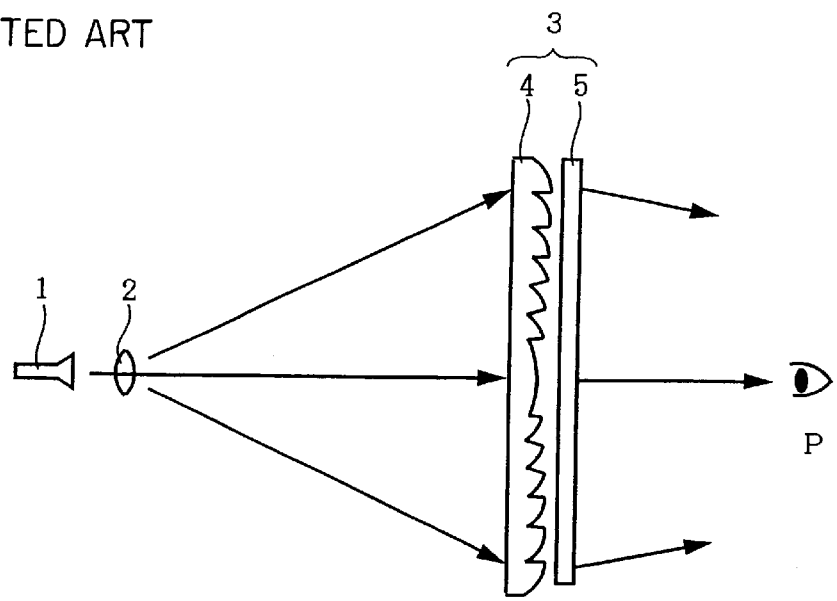
Fig. 16A
RELATED ART
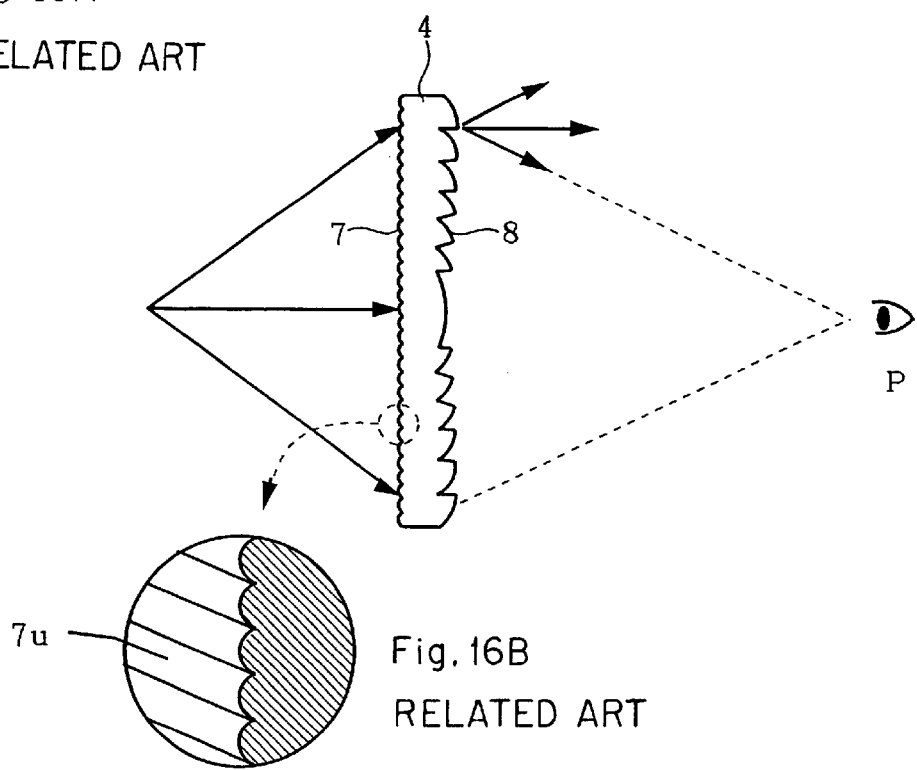
Fig. 16B
RELATED ART Fig. 17A
RELATED ART
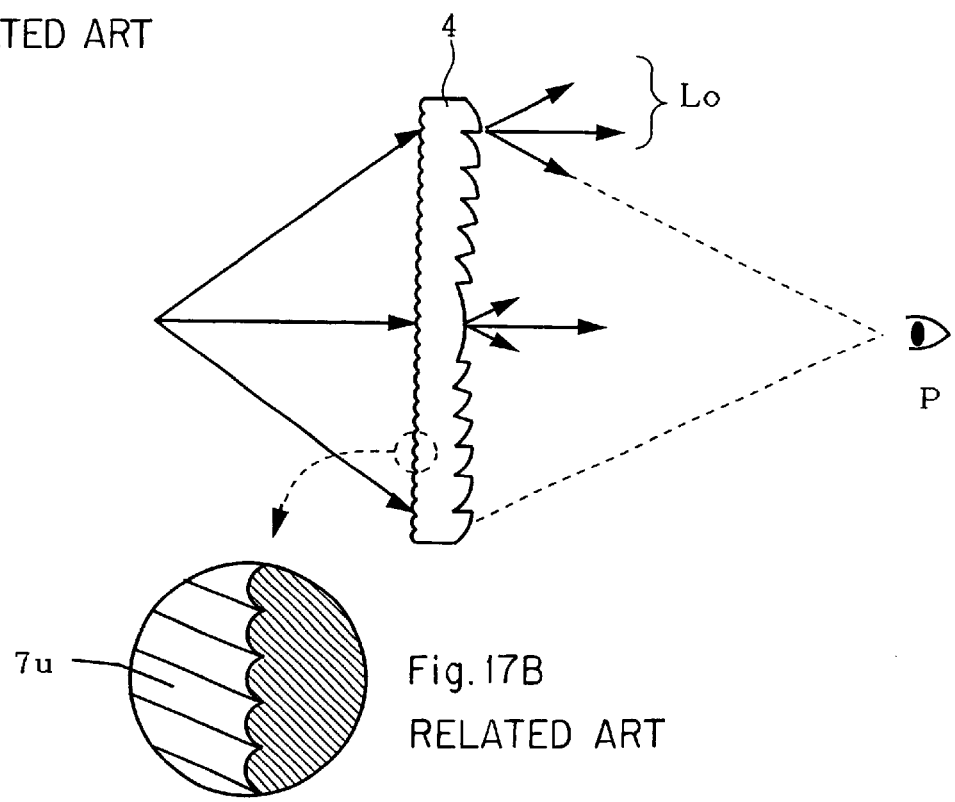
Fig. 17B
RELATED ART
Fig. 18
RELATED ART
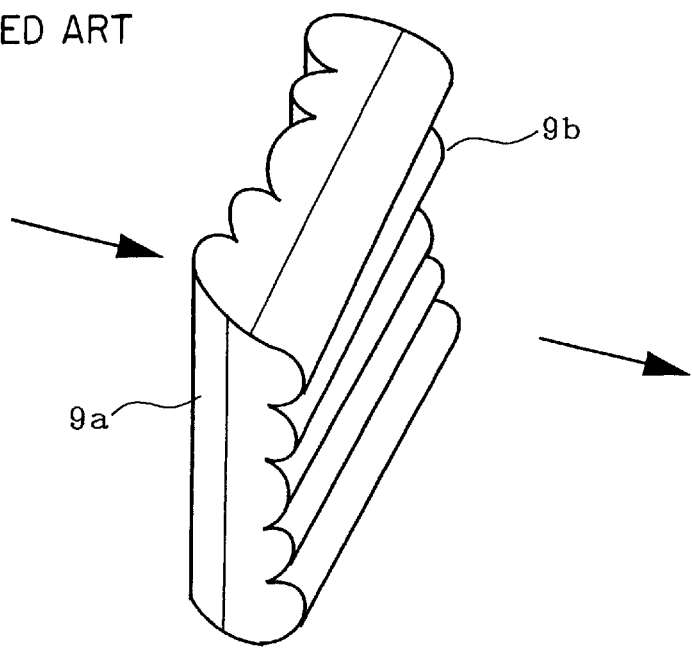

REAR PROJECTION SCREEN INCORPORATING A PRISM

BACKGROUND OF THE INVENTION

1. Field of the Invention

This invention relates to a rear projection screen used for a rear projection display.

2. Related Art

A rear projection display as, shown in FIG. 15, comprises a projection tube 1 for projecting optical images, a projection lens 2 for enlarging the optical images projected from the projection tube 1, and a rear projection screen 3 for forming images of the enlarged optical images, and an observer P observes the enlarged optical images projected from the projection tube 1 behind the screen 3 to the screen 3.

As the rear projection screen 3, a two-panel type screen comprised of a Fresnel lens sheet 4 for converging luminous flux projected from the projection tube 1 to the direction of the observer P and a lenticular lens sheet 5 which disperses the light emitted from the Fresnel lens sheet 4 to the horizontal direction of the screen (screen width direction) and the height direction of the screen (screen height direction) at prescribed angles at an appropriate rate for spreading a viewing angle to a prescribed range.

Recently in rear projection displays, decreasing distance between the projection lens 2 and the screen 3 is demanded to make the display slimmer. To meet this demand, it is necessary to increase the Fresnel angle of the Fresnel lens sheet 4. If this Fresnel angle is increased, however, reflection loss at the peripheral area of the Fresnel lens sheet 4 increases and the ratio of luminosity at the corners of the screen 3 to that at the center area of the screen 3 (so called peripheral luminance ratio) drops, which is a problem.

If the peak screen gain is increased to improve the luminosity of the rear projection display, the drop of peripheral luminance is an even more serious problem since the quantity of the diffuser, which is mixed in the component materials of the screen 3 for adjusting the dispersiblity of the light emitted from the screen 3, is decreased.

Conventionally, various countermeasures against such a problem of a peripheral luminance drop have been suggested. For example, the lenticular lens 7 for vertical diffusion is disposed on the opposite side of the Fresnel lens 8 of the Fresnel lens sheet 4 by vertically disposing many unit lenses, which are micro-cylindrical lenses 7u arranged with their longitudinal direction in the horizontal direction, as shown in FIG. 16 (e.g. Japanese Patent Application Laid-Open No. 2-18540). Another method known is increasing the vertical diffusibility of the light of a vertical lenticular lens at the peripheral area more than at the center area of the screen as shown in FIG. 17, so that a drop of the luminance at the peripheral area can be controlled (e.g. Japanese Patent Application Laid-Open No. 7-134338).

Another method is directing the light in the vertical direction to the direction of the observer by combining two linear Fresnel-lenticular lenses (two linear Fresnel lenses which also serve as lenticular lenses) 9a and 9b to improve the luminosity at the peripheral area of the screen as shown in FIG. 18 (U.S. Pat. No. 4,531,812).

Another method is combining two linear Fresnel lenses, one for the vertical direction and the other for the horizontal direction, to deflect the image light to the vertical direction (U.S. Pat. No. 5,477,380).

Another method is using a Fresnel lens sheet where a Fresnel lens is disposed on the incident surface of the light from the projection tube and a linear prism for deflecting light in the vertical direction is disposed on the outgoing surface (U.S. Pat. No. 4,512,631). With the above mentioned method of using the lenticular lens 7 for vertical diffusion in FIG. 16, however, when the peak screen gain exceeds 7, color irregularity (color shift) of the screen deteriorates because the refractive index of material differs depending on the difference of color (difference of wavelengths), therefore, reflection loss on the Fresnel lens differs depending on the difference of color, although color irregularity of the screen is not a problem when the peak screen gain is low due to the contribution of diffusion of lights in the vertical direction of the lenticular lens 7 for vertical diffusion. Another problem is that if diffusibility of the lenticular lens 7 for vertical diffusion is increased to increase peripheral luminance, the screen gain at the screen center area drops.

If a vertical lenticular lens is used where the vertical diffusibility of light is higher at the peripheral area than at the screen center area, both luminosity on the peripheral area of the screen and luminosity on the entire screen can be implemented which is unlike the case of using a vertical lenticular lens where the vertical diffusion of light is uniform, but even in this case at the peripheral area of the screen light $L_o$ which diffuses not only to the direction of the observer P but also to the invalid area at the top and bottom of the screen, as shown in FIG. 17, makes it impossible to improve light utilization efficiency.

In the case of a method in FIG. 18, where two linear Fresnel-lenticular lenses 9a and 9b are combined, loss of light due to reflection is greater than the case of using a circular Fresnel lens, since the refraction at the linear Fresnel-lenticular lenses 9a and 9b is high. Also in the case of a screen using the linear Fresnel-lenticular lenses 9a and 9b, light utilization efficiency in the effective area of the screen degrades due to the diffusion of light.

Even in the screen where two linear Fresnel lenses, one for the vertical direction and the other for the horizontal direction, are combined to deflect the image light in the vertical direction, the loss of light is greater than the case of using a circular Fresnel lens.

In the case of a screen using a Fresnel lens sheet where a Fresnel lens is on the incident surface of light from the projection tube and a linear prism for deflecting light in the vertical direction is on the outgoing surface, disposing the Fresnel lens on the incident surface of the light from the projection tube increases the loss of light.

SUMMARY OF THE INVENTION

Accordingly, it is an object of the present invention to solve the above problems of prior art, to increase the peak screen gain, and to improve the peripheral luminance ratio, without degrading light utilization efficiency.

The inventors discovered that the peripheral luminance of a screen can be improved without degrading light utilization efficiency by disposing the linear prism for controlling light in the vertical direction at the light incident side of the Fresnel lens sheet and converging the light emitted from the corners of the Fresnel lens sheet to the direction of the observer since the peripheral luminance ratio of the screen is dominated by the vertical diffusion characteristic of light, and completed the present invention.

That is, the present invention provides a rear projection screen incorporating a prism, used for a projection optical system where a projected light enters perpendicularly to the screen face, characterized in that the screen comprises a Fresnel lens sheet and a lenticular lens sheet, and the above mentioned Fresnel lens sheet has a linear prism on the surface at the projection light source side, and has a circular Fresnel lens on the surface at the observer side, the above mentioned linear prism acts as a linear Fresnel lens for converging image lights in the screen height direction, the above mentioned circular Fresnel lens acts to converge the image lights to the screen center direction, and the above mentioned lenticular lens sheet acts to disperse lights emitted from the Fresnel lens sheet in the horizontal direction.

More particularly, on the shape of the linear prism of the rear projection screen, the present invention provides an embodiment where the cross-sectional shape of the unit prism composing the linear prism is comprised of a straight line part and a curved part in the screen height direction, and $0.1 \leq r/p \leq 4$ (where $p \geq 0.05$) and $h \geq 0.005$ are satisfied when the pitch of the unit prism is p (mm), the radius when the shape of the curved part is approximated with a circle is r (mm), and the height of the prism is h (mm).

The present invention also provides an embodiment where the prism angle of the linear prism is 0° at the screen center area and 3°~15° at a 90% or outer position from the screen center in the screen height direction.

Also in the above mentioned rear projection screen, the present invention provides an embodiment where the lenticular lens sheet is a double sided lenticular lens sheet which has a lenticular lens on the incident side surface and the outgoing side surface of the image lights, and the top of the lenticular lens on the outgoing side surface is formed roughly at a focussing position on the lenticular lens of the incident side surface.

According to the rear projection screen of the present invention, a linear prism which acts as a linear Fresnel lens is formed on the surface at the projection light source side of the Fresnel lens sheet. While a lenticular lens for vertical diffusion which is used for a conventional rear projection screen attempts to improve the peripheral luminance of the screen utilizing the dispersibility of light, this linear prism, which can deflect light emitted from the screen to the direction of the observer, can efficiently improve peripheral luminance in the screen height direction.

If a circular Fresnel lens is formed on the surface at the projection light source side of the Fresnel lens sheet, light that enters the rise surface of the circular Fresnel lens does not transmit through the screen, which degrades light utilization efficiency, but according to the present invention, where the circular Fresnel lens is formed on the surface at the observer side of the Fresnel lens sheet, the loss of incident light can be decreased.

Regarding the shape of the linear prism of this rear projection screen, if the cross-sectional shape of the unit prism composing the linear prism is comprised of a straight line part and curved part in the screen height direction (that is, a shape where the top of the prism is rounded), light that enters from the curved part to the prism is diffused, therefore a ghost that is generated when the prism angle is at a specified angle cannot occur. This means that a bright screen can be observed even if the screen is observed from a deep angle.

If the prism angle of the linear prism is 0° at the screen center area and 3°~15° at a 90% or outer position from the screen center in the screen height direction, then loss of light on the linear prism at the projection source side and on the circular Fresnel lens at the observer side is decreased, and the light transmittance of the sheet, which is comprised of the linear prism and the circular Fresnel lens, can be increased.

BRIEF DESCRIPTION OF DRAWINGS

FIGS. 5A, 5B, 5C and 5D are cross-sectional views of the unit prism;

FIG. 6 is a relational diagram of the prism angle and the light transmittance of the Fresnel lens sheet incorporating a prism;

FIG. 15 is an explanatory diagram depicting the general lights of the rear projection display;

FIG. 16 is a cross-sectional view of a conventional Fresnel lens sheet;

FIG. 17 is a cross-sectional view of a conventional Fresnel lens sheet; and

FIG. 18 is an external view of a conventional Fresnel lens sheet.

DETAILED DESCRIPTION OF THE INVENTION

Figure 1:
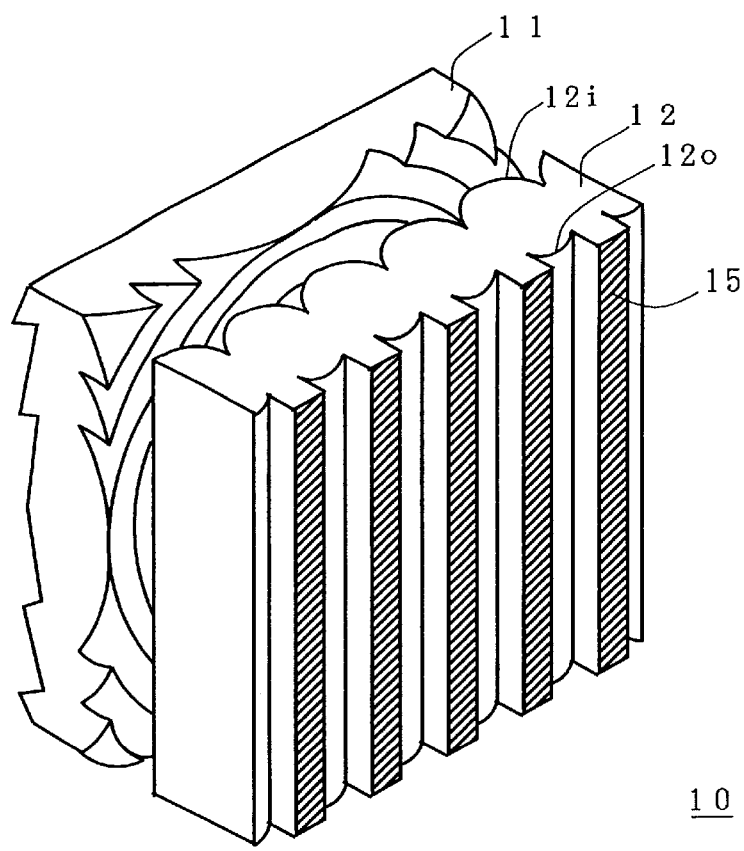
FIG. 1 is an external view of the rear projection screen incorporating a prism of the present invention.

The present invention will now be described referring to the drawings. In the drawings, same numerals denote a same or similar composing element.

Figure 2:
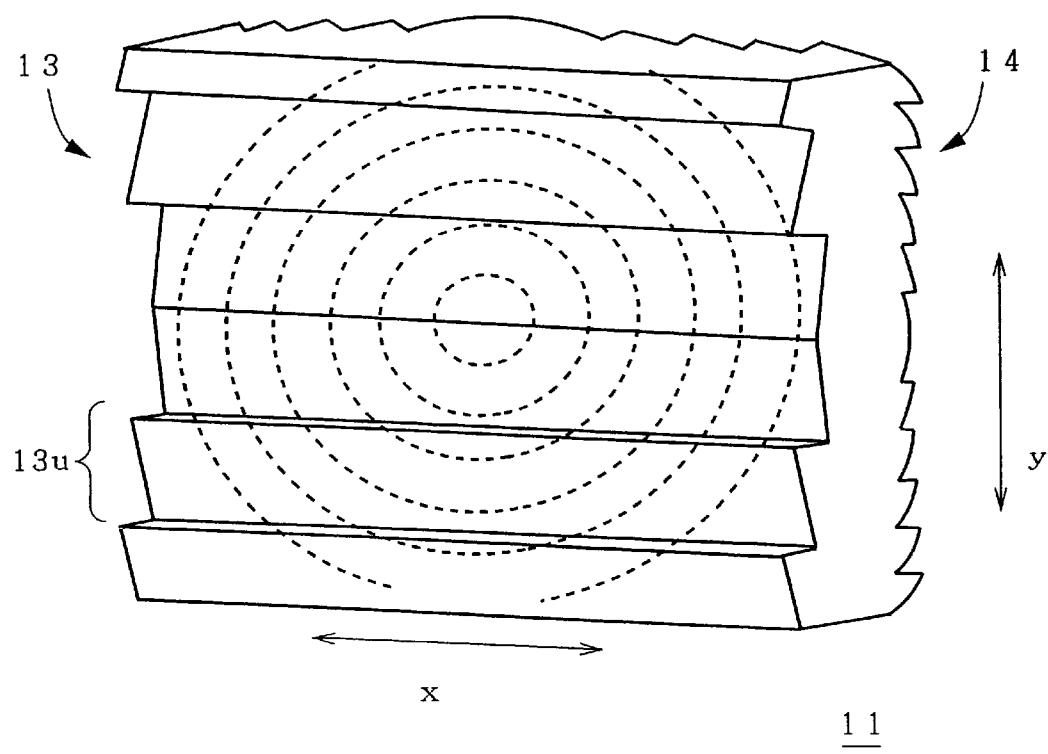
FIG. 2 is an external view of the Fresnel lens sheet incorporating a prism.

FIG. 1 is an external view of a rear projection screen incorporating a prism 10 in accordance with the present invention, and FIG. 2 is an external view of a Fresnel lens sheet incorporating a prism 11 used for this screen 10.

This screen 10 is used for a projection optical system where projection light from the projection tube enters perpendicularly from the rear face of the screen 10 to the screen 10, just like a conventional rear type projection screen shown in FIG. 15.

As FIG. 1 shows, this screen 10 comprises a Fresnel lens sheet incorporating a prism 11 and a lenticular lens sheet 12.

As FIG. 2 shows, the Fresnel lens sheet incorporating a prism 11 has a linear prism 13 at the projection light source side, where a plurality of unit prisms 13u, which height in horizontal direction x of the screen is fixed and height in screen height direction y is different, are disposed in screen height direction y. The Fresnel lens sheet incorporating a prism 11 also has a circular Fresnel lens 14 at the observer side.

Figure 3:
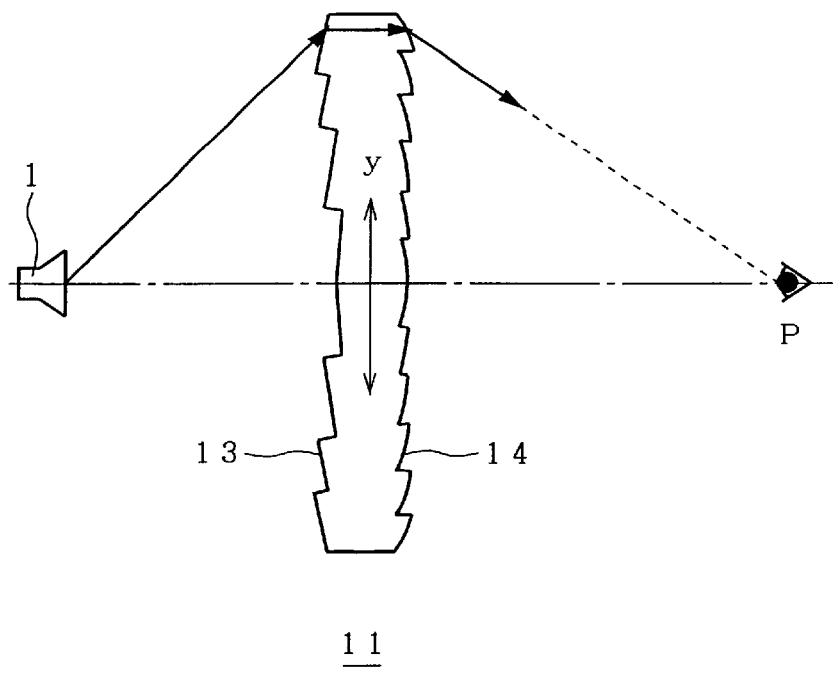
FIG. 3 is an explanatory diagram depicting the lights of the Fresnel lens sheet incorporating a prism.

When the linear prism 13 is formed on the projection light source side of the Fresnel lens sheet 11 in this way, it is possible to make the prism angle of the unit prisms 13u different at the up and down in the screen height direction y of the Fresnel lens sheet 11, and to make the orientation of the prism to be symmetrical at the top and bottom in the screen height direction y, as shown in FIG. 2. This makes it possible to deflect light emitted from the Fresnel lens sheet 11 more as approaching the top and bottom corners of the Fresnel lens sheet 11, and to direct light emitted from the peripheral area of the Fresnel lens sheet 11 to the observer P without degrading light utilization efficiency, as shown in FIG. 3.

The converging function of the linear prism 13 is the same as the converging function of the linear Fresnel lens which converges image lights in screen height direction y, but in the case of a linear Fresnel lens, which basically converges lights by itself, the refractive angle is large, but the major difference of the present invention is that the refractive angle can be decreased and reflection loss is made small because a linear prism 13 and the circular Fresnel lens 14 are combined.

Figure 4:
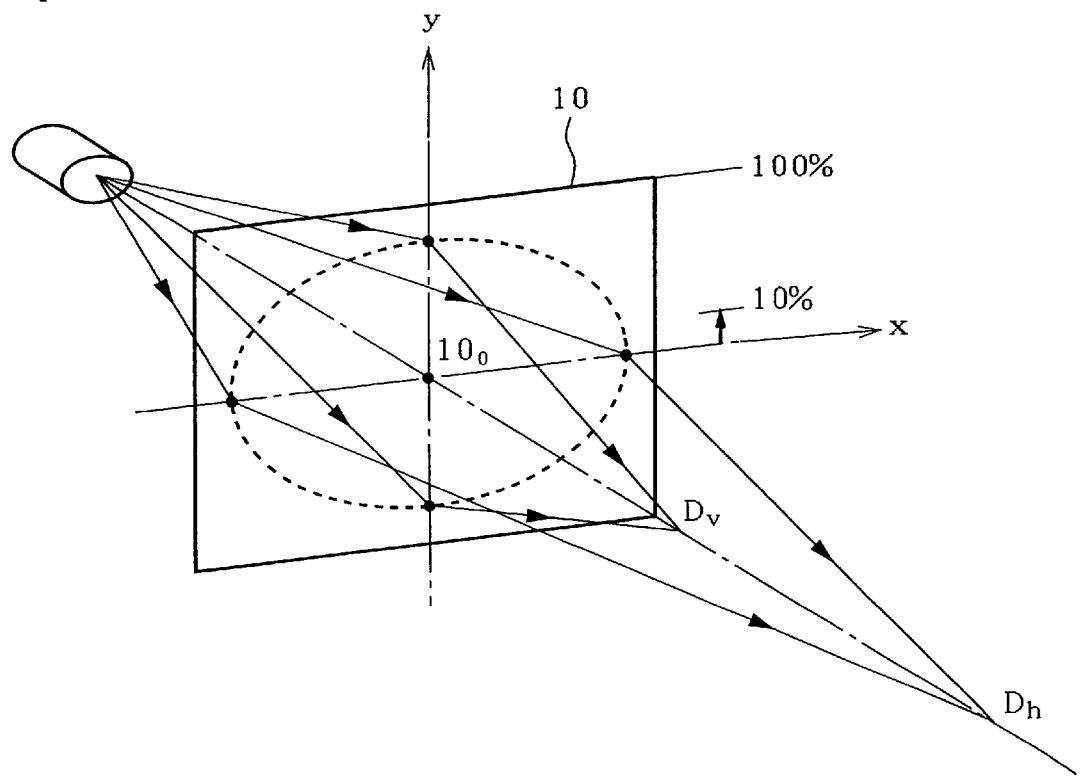
FIG. 4 is an explanatory diagram depicting the lights of the rear projection screen incorporating a prism.

The circular Fresnel lens 14 on the surface at the observer side of the Fresnel lens sheet 11 converges light emitted from the projection tube 1 to a prescribed converging position. The linear prism 13 on the surface at the projection light source side of the Fresnel lens sheet 11, on the other hand, deflects light emitted from the Fresnel lens sheet 11 more as approaching the top and bottom corners of the Fresnel lens sheet 11, as mentioned above. Therefore in the peripheral area of this screen 10, the converging distance $D_v$ in height direction y of the screen 10 is shorter than the converging distance $D_h$ in horizontal direction x of the screen, as shown in FIG. 4. In this case, it is preferable to make the converging distance $D_v$ in the screen height direction y to be shorter than the converging distance $D_h$ in the horizontal direction x of the screen in a 10% or outer area from the center area $10_0$ of the screen 10 in screen height direction y, so that uniformity of luminosity on the screen 10 can be better.

It is preferable to set the focal length f (mm) of the circular Fresnel lens 14, which defines the converging distance $D_h$ in horizontal direction x of the screen 10 to satisfy $$0.8 < f/D_a < 1.0,$$

where $D_a$ (mm) is the distance from the projection light source 1 to the Fresnel lens sheet 11, in order to improve the luminous uniformity on the entire screen 10.

FIG. 5A is a cross-sectional view of the preferable shape of the unit prism 13u of the linear prism 13. In accordance with the present invention, the cross-sectional shape of the unit prism 13u may be a triangle as shown in FIG. 5B, but it is preferable to be a shape comprised of a straight line part to form the prism surface 13a and the curved part 13b approximated by an arc as shown in FIG. 5A. By making the shape of the unit prism 13u like this, light which enters from the curved part 13b to the linear prism 13 is diffused, therefore when the unit prism 13u has a cross-sectional shape shown in FIG. 5B, a ghost generated at specific prism angle θ can be canceled. Also even when the observer looks the screen 10 from a deep angle, the screen 10 can be observed as bright.

As a shape of the unit prism 13u, the cross-sectional shape may be such that the rise surface 13c of the prism presents a concave lens shape as shown in FIG. 5C. This can also cancel the ghost.

Also as a shape of the unit prism 13u, the rise surface 13c of the prism may have micro-bumps as shown in FIG. 5D. This can also cancel the ghost.

When the radius of an arc that approximates the curved part 13b is r (mm), and the length of one pitch is p (mm) and the height of the prism is h (mm), it is preferable to be satisfied $$0.1 \leq r/p \leq 4$$

(wherein $p \geq 0.05$) and
$h \geq 0.005$ for the cross-sectional shape of the unit prism 13u, so that uniformity of luminosity on the entire screen can be maintained when the screen 10 is observed from a position other than the position of observer P shown in FIG. 3.

It is also preferable to make prism angle θ (deg) of the linear prism 13 to be 0° at the screen center area, and to be 3°~15° at a 90% or outer position from the screen center in the screen height direction. This can increase light transmittance T(%) at the screen corners of the Fresnel lens sheet incorporating a prism 11 when the converging distance of the Fresnel lens sheet incorporating a prism 11 is constant and can decrease the loss of light, as shown in FIG. 6.

The relational diagram of prism angle θ (deg) and light transmittance T(%) in FIG. 6 can be determined by calculating reflectance on the circular Fresnel lens 14 surface and the linear prism 13 surface. The example shown in FIG. 6 has been calculated for the case when the circular Fresnel lens 14 and the linear prism 13 are combined such that the converging distance of the screen becomes constant.

Figure 7:
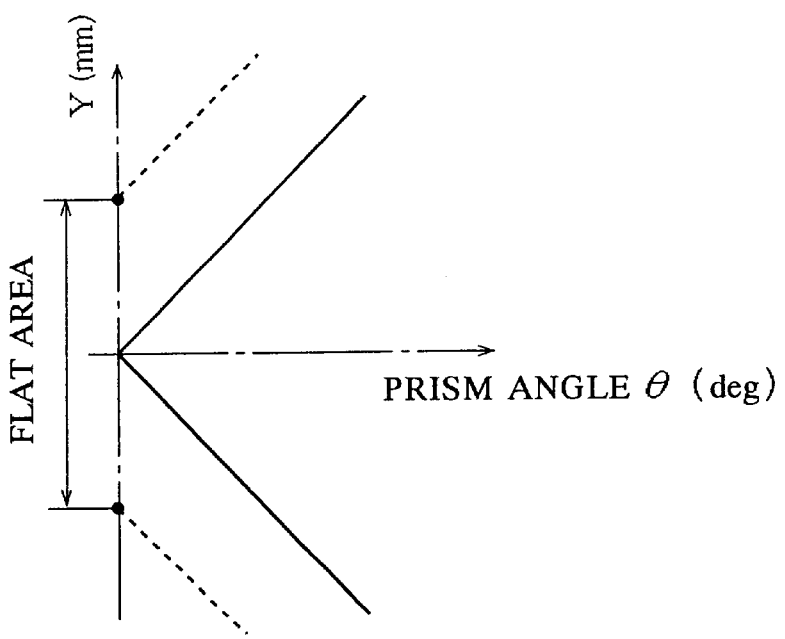
FIG. 7 is a relational diagram of the prism angle of the unit prism and the distance from the screen center in the screen height direction.
Figure 8:
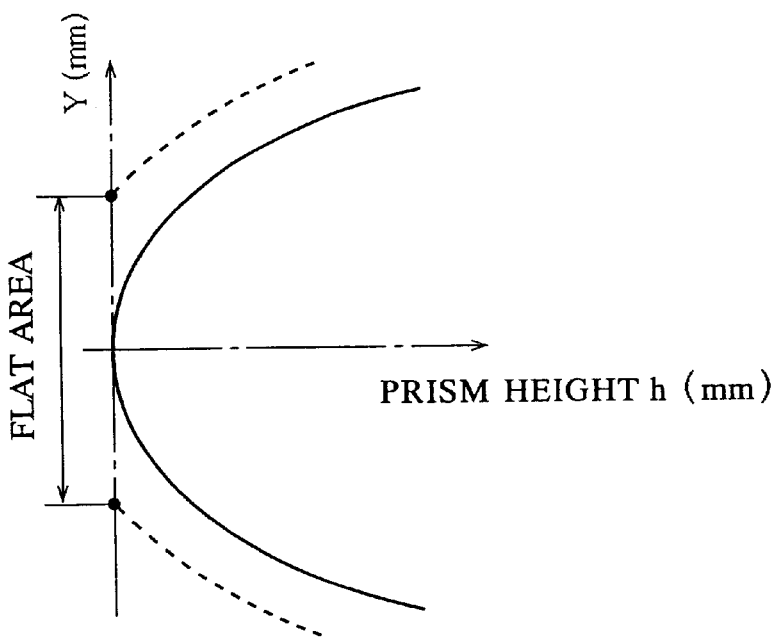
FIG. 8 is a relational diagram of the height of the lens of the unit prism and the distance from the screen center in the screen height direction.

As an aspect to make the prism angle θ (deg) or the height h (mm) of the unit prism 13u different between the screen center area and the top and bottom edges of the screen, it is preferable, for example, to continuously change the prism angle θ (deg) or the height h (mm) with respect to the distance Y (mm) from the screen center in the screen height direction, as shown in FIG. 7 or FIG. 8. As shown with a broken line in these figures, a flat area where the unit prisms are not formed may be disposed at the screen center area.

The shape of the linear prism 13 which has the above shape can be derived from the following (Formula 1)

$$H = \frac{C*Y^2}{\{1 + \sqrt{1-(K+1)C^2*Y^2}\}} + D*Y^4 + E*Y^6 + F*Y^8 + G*Y^{10} \quad \text{(Formula 1)}$$

The prism angle θ (deg) can be determined from the following formula (Formula 2).

$$\theta = \arc \operatorname{Tan}(dH/dY) \quad \text{(Formula 2)}$$

In the above (Formula 1) and (Formula 2), C, K, D, E, F and G are the shape factors of the change of the height of the prism respectively, Y (mm) is a distance from the center of the screen 10, and H (mm) is the height of the prism.

As the lenticular lens sheet 12 composing the rear projection screen incorporating a prism 10 of the present invention, it is preferable to use a double sided lenticular lens sheet where an incident side lenticular lens 12$i$ is on the light source side surface of the image light, an outgoing side lenticular lens 12$o$ is on the observer side surface, and the top of the outgoing side lenticular lens 12$o$ is formed roughly at the focussing position of the incident side lenticular lens 12$i$, as shown in FIG. 1. It is also preferable to form a light absorption layer 15 at the non-converging area of the incident side lenticular lens 12$i$ on the outgoing side lenticular lens 12$o$.

EXAMPLES

Working Examples of the present invention will now be concretely described below.

Working Examples 1~3, Comparative Examples 1, 2

We fabricated 50 inch size rear projection displays using the screen in FIG. 1 (working examples 1~3), the screen in FIG. 15 (comparative example 1) or the screen comprised of a lenticular lens for vertical diffusion in FIG. 17 and a lenticular lens sheet (located on an observer side) (comparative example 2).

Table 1 shows the shape factors when the shape of the Fresnel lens sheets of these screens are represented with the above mentioned (Formula 1). As a lenticular lens sheet of these screens, we used a double sided lenticular lens sheet having black stripes (a light absorption layer) of 0.72 mm pitch.

We calculated the converging distance (m) from left to right (horizontal direction) of the screen, the converging distance (m) from top to bottom (height direction) of the screen, and measured the peak screen gain, peripheral luminance ratio (%) and the deviation of CYE color coordinates at the screen corners from the color coordinates at the center area. The distance between the projection tube and the screen is 826 mm for the working examples 1 and 3 and comparison examples 1 and 2, and 866 mm for the working example 2. The measurement position of the above evaluation items is 3 m from the front face of the screen. To adjust the peak screen gain to be constant, a diffuser was dispersed on the sheet for the Fresnel lens sheet incorporating a prism and the comparison example 1.

Table 1 shows the result.

TABLE 1

| | | Shape factor | | Converging distance | | Peak screen gain | Peripheral luminance ratio (%) | Deviation of color coordinates | f value of circular Fresnel (mm) |
|---|---|---|---|---|---|---|---|---|---|
| | | Linear prism (incident side) | Fresnel lens (outgoing side) | Horizontal (m) | Vertical (m) | | | | |
| Working Example 1 Incorporating linear prism | C | 1.5E−4 | 2.5E−3 | 12.5 | 4.5 | 7.3 | 25.9 | 0.024 | 775 |
| | K | −4.5E−1 | −1.03 | | | | | | |
| | D | 0 | 0 | | | | | | |
| | E | 0 | 0 | | | | | | |
| | F | 0 | 0 | | | | | | |
| | G | 0 | 0 | | | | | | |
| Working Example 2 Incorporating linear prism | C | 4.0E−4 | 2.4E−3 | 53 | 3.2 | 7.3 | 25.1 | | 852 |
| | K | −4.5E−1 | −1.07 | | | | | | |
| | D | 0 | 0 | | | | | | |
| | E | 0 | 0 | | | | | | |
| | F | 0 | 0 | | | | | | |
| | G | 0 | 0 | | | | | | |
| Working Example 3 Incorporating linear prism | C | 4.0E−4 | 2.5E−3 | 12.5 | 2.5 | 7.3 | 22.9 | | 775 |
| | K | −4.5E−1 | −1.03 | | | | | | |
| | D | 0 | 0 | | | | | | |
| | E | 0 | 0 | | | | | | |
| | F | 0 | 0 | | | | | | |
| | G | 0 | 0 | | | | | | |
| Comparative example 1 Without Linear Prism | C | | 2.5E−3 | 12.5 | 12.5 | 7.3 | 15.4 | 0.034 | 775 |
| | K | | −1.03 | | | | | | |
| | D | | 0 | | | | | | |
| | E | | 0 | | | | | | |
| | F | | 0 | | | | | | |
| | G | | 0 | | | | | | |
| Comparative example 2 Lenticular lens for vertical diffusion at incident side | C | | 2.5E−3 | 12.5 | 12.5 | 7.3 | 19.7 | | 775 |
| | K | | −1.03 | | | | | | |
| | D | | 0 | | | | | | |
| | E | | 0 | | | | | | |
| | F | | 0 | | | | | | |
| | G | | 0 | | | | | | |

As the result in Table 1 shows, in the case of the screens of the working examples 1~3 where the linear prism is incorporated on the light source side surface of the Fresnel lens sheet of the screen, the peripheral luminance ratio (%) and the deviation of the CYE color coordinates at the corners of the screen from the color coordinates at the center area have been improved compared with the screen of the comparison example 1. Even compared with the screen of the comparison example 2 which has a lenticular lens for vertical diffusion at the light source side of the Fresnel lens sheet, the peripheral luminance ratios of the screens of the working examples 1~3 are better. As a consequence, a screen with a high peripheral luminance ratio can be obtained according to the present invention.

Reference Example 1

To examine an optimum relationship between the distance $D_a$ (mm) from the projection light source to the Fresnel lens sheet and the focal length f (mm) of the circular Fresnel lens, we set distance $D_a$ from the projection light source to the Fresnel lens sheet at various values in a 500~1200 mm range, and set (f/$D_a$) at various values in a 0.75~1.05 range, and calculated the distance $D_b$ (mm) between the converging point, which is determined by the distance $D_a$ and (f/$D_a$), and the Fresnel lens sheet.

Figure 9:
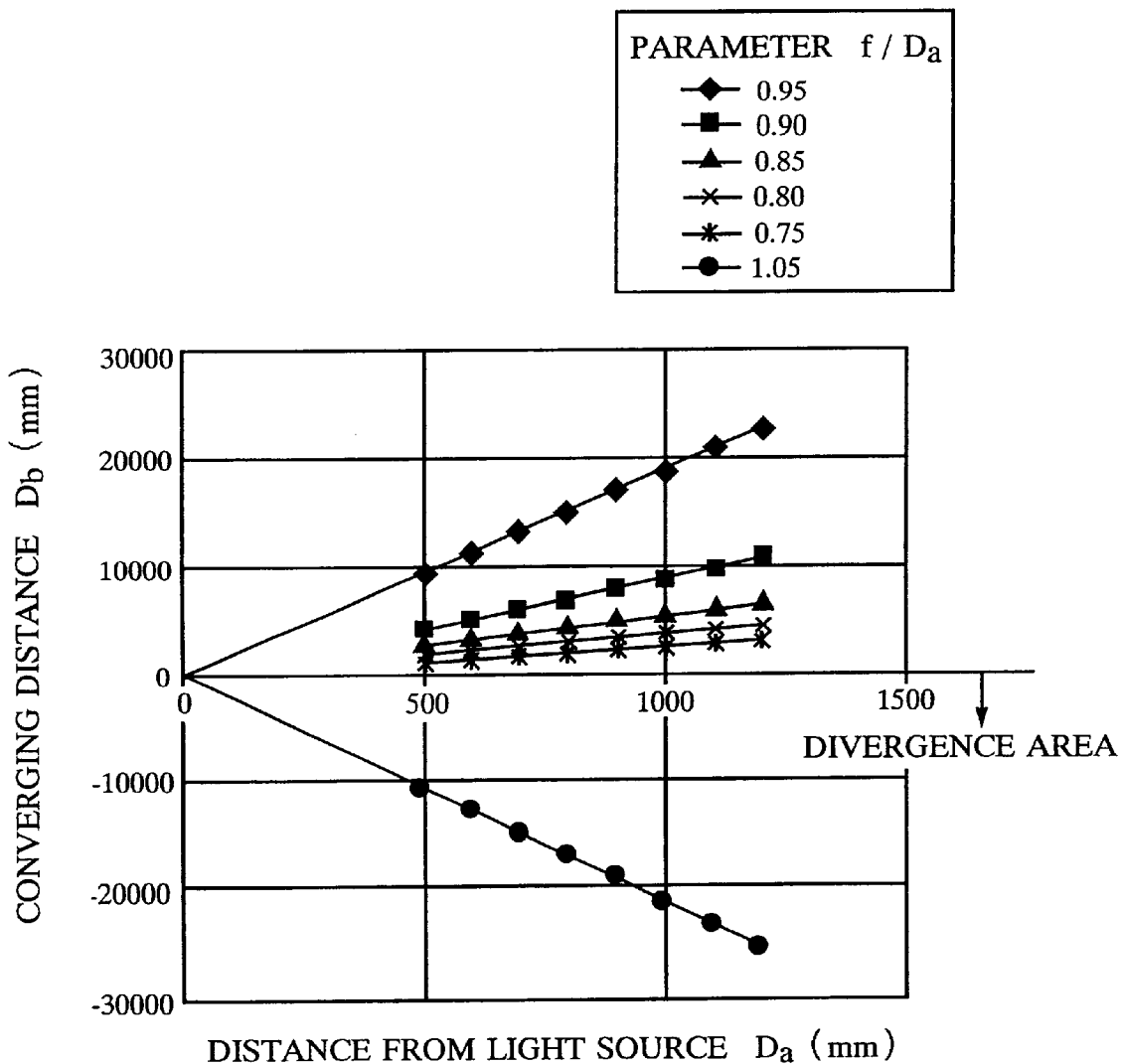
FIG. 9 is a relational diagram of the ratio between the distance $D_a$(mm) from the projection light source to the Fresnel lens sheet and the focal length f(mm) of the circular Fresnel lens ($f/D_a$), the distance $D_a$(mm) from the projection light source to the Fresnel lens sheet, and the distance $D_b$(mm) between the converging point and the Fresnel lens sheet.

Table 2 and FIG. 9 show the result.

As the result shows, when the value (f/$D_a$) is smaller than 1.0, image light converges in the direction of the observation point, and the screen becomes brighter. If image light converges too much when the value is smaller than 0.8, the screen peripheral area tends to color yellow and cyan. Therefore 0.8~1.0 is preferable as the value of (f/$D_a$).

TABLE 2

| | (f/$D_a$) | | | | | |
|---|---|---|---|---|---|---|
| $D_a$ | 1.05 | 0.95 | 0.90 | 0.85 | 0.80 | 0.75 |
| 1200 | −25200 | 22800 | 10800 | 6800 | 4800 | 3600 |
| 1100 | −23100 | 20900 | 9900 | 6233.333 | 4400 | 3300 |
| 1000 | −21000 | 19000 | 9000 | 5666.667 | 4000 | 3000 |
| 900 | −18900 | 17100 | 8100 | 5100 | 3600 | 2700 |
| 800 | −16800 | 15200 | 7200 | 4533.333 | 3200 | 2400 |
| 700 | −14700 | 13300 | 6300 | 3966.667 | 2800 | 2100 |
| 600 | −12600 | 11400 | 5400 | 3400 | 2400 | 1800 |
| 500 | −10500 | 9500 | 4500 | 2833.333 | 2000 | 1500 |

Reference Example 2

To determine an optimum value of r/p when the radius of an arc that approximates the curved part 13b is r (mm) and the length of one pitch is p (mm) for the cross-sectional shape of the unit prism 13u of the linear prism (see FIG. 5A), we assumed the following four types of shapes as the unit prism 13u, using the shape factors C and K of (Formula 1) which represents the shape of the above mentioned linear prism, projection distance a (mm) of the prism surface 13a of the unit prism 13u in the screen height direction, and the projection distance b (mm) of the curved part 13b of the unit prism 13u in the screen height direction, and for each type we determined r/p in the area which distance Y (mm) is up to 500 mm from the screen center in the screen height direction. FIGS. 11~14 show these four types of shapes. "Shape without r" in the figures is the case when the radius r of the curved part is "0", and the approximated shape is the case when the prism shape is approximated using the projection distance a and b.

(1) When the prism angle θ is small and the radius r of the curved part is large:

C=1.0E−4, K=−0.44, a=0.7, b=0.64

(2) When the prism angle θ is small and the radius r of the curved part is small:

C=1.0E−4, K=−0.44, a=0.7, b=0.30

(3) When the prism angle θ is large and the radius r of the curved part is large:

C=5.0E−4, K=−0.44, a=0.7, b=0.64

(4) When the prism angle θ is large and the radius r of the curved part is small:

C=5.0E−4, K=−0.44, a=0.7, b=0.30

Figure 10:
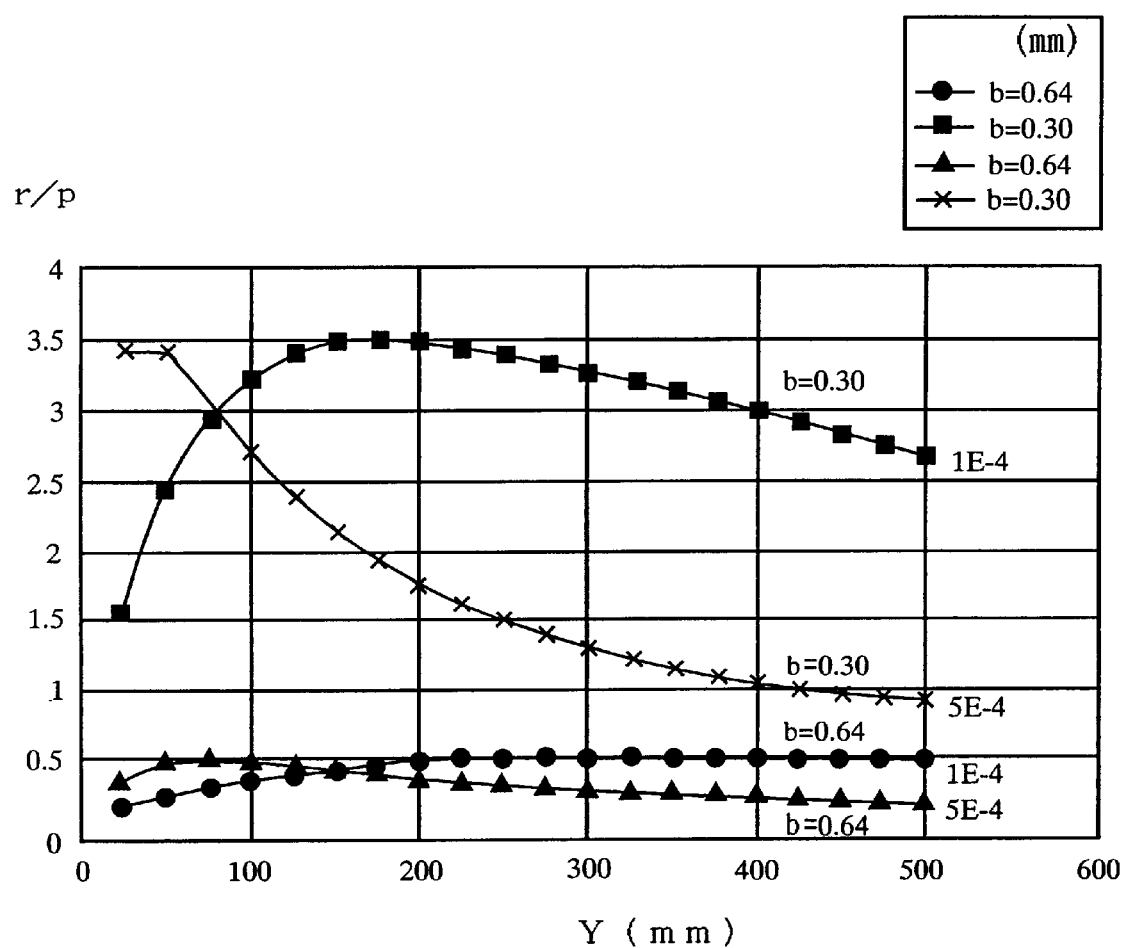
FIG. 10 is a relational diagram between the distance Y(mm) from the screen center in the screen height direction and r/p.
Figure 11:
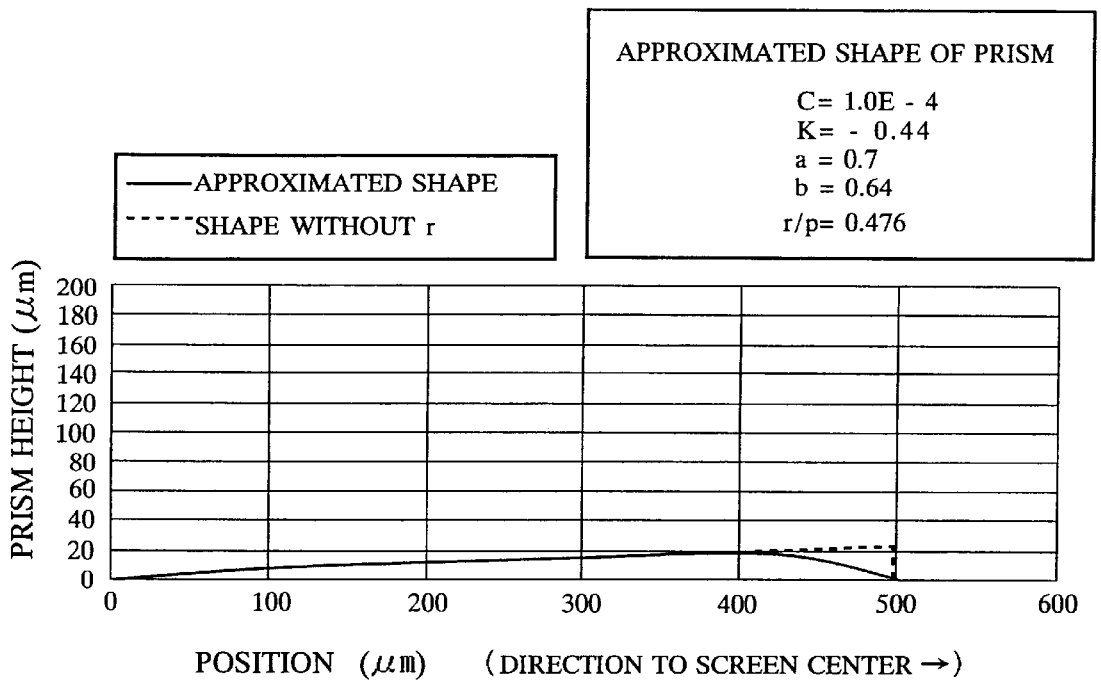
FIG. 11 is a diagram depicting the typical cross-sectional shape of the unit prism.
Figure 12:
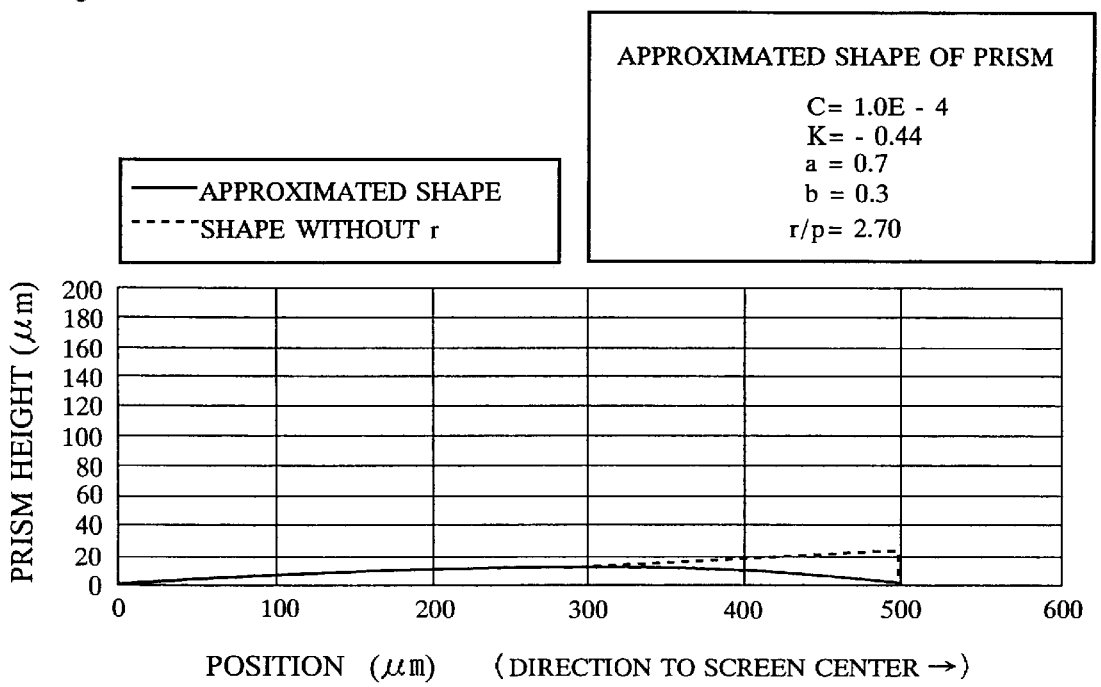
FIG. 12 is a diagram depicting the typical cross-sectional shape of the unit prism.
Figure 13:
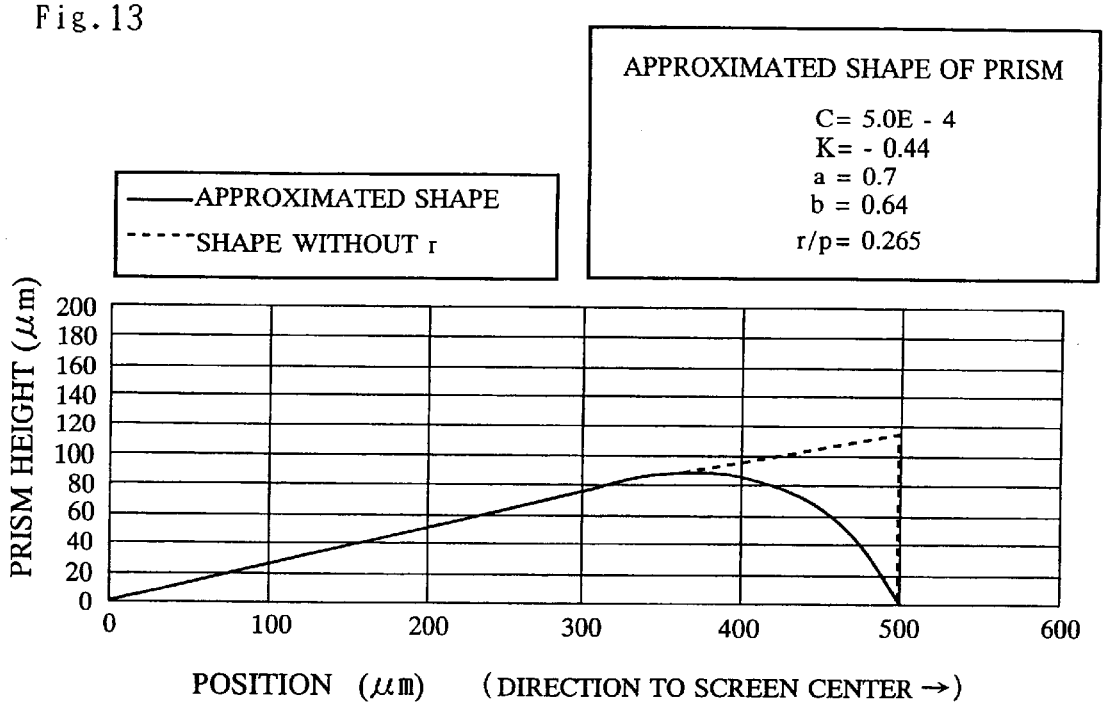
FIG. 13 is a diagram depicting the typical cross-sectional shape of the unit prism.
Figure 14:
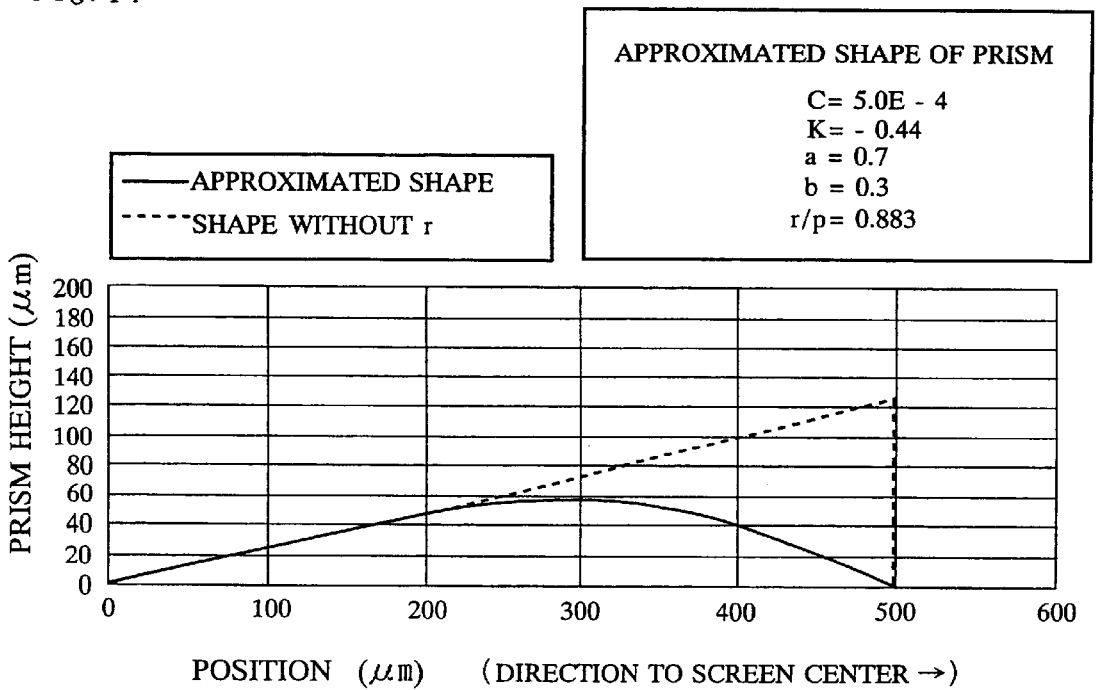
FIG. 14 is a diagram depicting the typical cross-sectional shape of the unit prism.

Table 3 and FIG. 10 show this result. We confirmed that the shape of the unit prism of the working examples satisfy 0.1~4 of r/p. If r/p is smaller than this range, the ghost light becomes stronger, and if r/p is greater than this range, lights cannot be converged effectively. Therefore the optimum range of r/p is the above mentioned range.

TABLE 3 r/p calculation example

| Distance Y (mm) | C = 1.0E−4 b = 0.64 | C = 1.0E−4 b = 0.30 | C = 5.0E−4 b = 0.64 | C = 5.0E−4 b = 0.30 |
|---|---|---|---|---|
| 0 | | | | |
| 25 | 0.123209 | 1.539469 | 0.380734 | 3.416615 |
| 50 | 0.215983 | 2.43162 | 0.475404 | 3.403164 |
| 75 | 0.286328 | 2.953379 | 0.488628 | 3.048273 |
| 100 | 0.339891 | 3.253527 | 0.475535 | 2.699433 |
| 125 | 0.380734 | 3.416615 | 0.454216 | 2.403642 |
| 150 | 0.411826 | 3.492872 | 0.43127 | 2.159174 |
| 175 | 0.435369 | 3.513232 | 0.409189 | 1.95682 |
| 200 | 0.453022 | 3.497301 | 0.388865 | 1.78782 |
| 225 | 0.466044 | 3.457806 | 0.370533 | 1.645155 |
| 250 | 0.475404 | 3.403164 | 0.354158 | 1.523436 |
| 275 | 0.481855 | 3.339026 | 0.3396 | 1.418556 |
| 300 | 0.485984 | 3.26923 | 0.326687 | 1.327368 |
| 325 | 0.488256 | 3.196398 | 0.315244 | 1.24744 |
| 350 | 0.489039 | 3.122334 | 0.305109 | 1.176868 |
| 375 | 0.488628 | 3.048273 | 0.296138 | 1.114149 |
| 400 | 0.48726 | 2.975059 | 0.288203 | 1.058079 |
| 425 | 0.485126 | 2.903259 | 0.281193 | 1.007685 |
| 450 | 0.48238 | 2.833248 | 0.275011 | 0.962175 |
| 475 | 0.479148 | 2.76526 | 0.269574 | 0.920895 |
| 500 | 0.475535 | 2.699433 | 0.264809 | 0.883303 |

According to the present invention, it is possible to increase the peak screen gain and to improve the peripheral luminance ratio when an observer views the screen, without degrading light utilization efficiency.

What is claimed is:

1. A rear projection screen used for a projection optical system where a projected light enters perpendicularly to a screen face, said screen comprising:
   a Fresnel lens sheet having a linear prism on a surface at a projection light source side, and a circular Fresnel lens on a surface at an observer side, said linear prism being configured to act as a linear Fresnel lens to converge image lights in a screen height direction, said circular Fresnel lens being configured to converge the image lights to a screen center direction, said linear prism having a plurality of unit prisms extending in a horizontal direction, wherein an overall height of an individual unit prism of said plurality of unit prisms is larger for a unit prism positioned closer to a screen center area than for a unit prism positioned further from the screen center area; and
   a lenticular lens sheet configured to disperse lights emitted from the Fresnel lens sheet in the horizontal direction.

2. The rear projection screen incorporating a prism according to claim 1, wherein a converging distance in the screen height direction is shorter than a converging distance in the horizontal direction of the screen in the 10% or outer area from a screen center in the screen height direction.

3. The rear projection screen incorporating a prism according to claim 2, wherein $0.8 < f/D_a < 1.0$ is satisfied when a focal length of the circular Fresnel lens is f and a distance from a projection light source to the Fresnel lens sheet is $D_a$.

4. The rear projection screen incorporating a prism according to claim 1, wherein a cross-sectional shape of a unit prism comprising the linear prism is comprised of a straight line part and a curved part in the screen height direction, and $0.1 \leq r/p \leq 4$ (where $p \geq 0.05$) and $h \geq 0.005$ are satisfied when a pitch of the unit prism is p (mm), a radius when the shape of the curved part is approximated with a circle is r (mm), and a height of the prism is h (mm).

5. The rear projection screen incorporating a prism according to claim 1, wherein a prism angle of an individual unit prism of said plurality of unit prisms varies from 0° at a screen center area to between 3° and 15° at a 90% or outer position from the screen center area in the screen height direction.

6. The rear projection screen incorporating a prism according to claim 1, wherein the lenticular lens sheet is a double sided lenticular lens sheet which has a lenticular lens on an incident side surface and outgoing side surface of the image lights, respectively, and a top of the lenticular lens on the outgoing side surface is formed roughly at a focussing position of the lenticular lens on the incident side surface.

7. The rear projection screen incorporating a prism according to claim 1, wherein a prism angle of an individual unit prism of said plurality of unit prisms is larger for a unit prism positioned further from to the screen center area than for a unit prism positioned closer to the screen center area.

8. The rear projection screen incorporating a prism according to claim 1, wherein an individual unit prism of said plurality of unit prisms has a flat prism surface defined by a single facet.

9. The rear projection screen according to claim 1, wherein said linear prism has a flat area disposed at said screen center area, said flat area having no unit prisms formed therein.

10. A rear projection screen used for a projection optical system where a projected light enters perpendicularly to a screen face, said screen comprising:

a Fresnel lens sheet having a linear prism on a surface at a projection light source side, and a circular Fresnel lens on a surface at an observer side, said linear prism being configured to act as a linear Fresnel lens to converge image lights in a screen height direction, said circular Fresnel lens being configured to converge the image lights to a screen center direction, said linear prism having a plurality of unit prisms extending in a horizontal direction, wherein a prism angle of an individual unit prism of said plurality of unit prisms is larger for a unit prism positioned further from to a screen center area than for a unit prism positioned closer to the screen center area; and a lenticular lens sheet configured to disperse lights emitted from the Fresnel lens sheet in the horizontal direction.

11. The rear projection screen according to claim 10, wherein an individual unit prism of said plurality of unit prisms has a flat prism surface defined by a single facet.

12. The rear projection screen according to claim 10, wherein said linear prism has a flat area disposed at said screen center area, said flat area having no unit prisms formed therein.

* * * * *